(12) United States Patent
Wilson et al.

(10) Patent No.: US 9,531,865 B2
(45) Date of Patent: *Dec. 27, 2016

(54) HACKER-RESISTANT DENIAL OF WIRELESS DEVICE OPERATION IN RESTRICTED AREAS

(71) Applicants: Kristine A. Wilson, Murphy, TX (US); Kelce S. Wilson, Murphy, TX (US); Edward A. Wilson, Prescott, AZ (US)

(72) Inventors: Kristine A. Wilson, Murphy, TX (US); Kelce S. Wilson, Murphy, TX (US); Edward A. Wilson, Prescott, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/920,842

(22) Filed: Oct. 22, 2015

(65) Prior Publication Data

US 2016/0044158 A1 Feb. 11, 2016

Related U.S. Application Data

(66) Continuation of application No. 14/446,316, filed on Jul. 29, 2014, now abandoned, which is a
(Continued)

(51) Int. Cl.
*H04M 3/16* (2006.01)
*H04M 1/725* (2006.01)
(Continued)

(52) U.S. Cl.
CPC .......... *H04M 1/72577* (2013.01); *H04K 3/65* (2013.01); *H04K 3/84* (2013.01); *H04M 1/72572* (2013.01);
(Continued)

(58) Field of Classification Search
CPC .. H04M 1/72519; H04W 12/06; H04W 8/245; H04W 48/04
(Continued)

(56) References Cited

U.S. PATENT DOCUMENTS 5,327,144 A 7/1994 Stilp
5,890,068 A 3/1999 Fattouche
(Continued)

OTHER PUBLICATIONS

Johnson, Kevin; "Smuggled phones flourish in prisons"; USA Today; Nov. 21, 2008; p. 1A.
(Continued)

*Primary Examiner* — Danh Le
(74) *Attorney, Agent, or Firm* — Kelce S. Wilson

(57) ABSTRACT

A system for restricting operation of wireless devices, for example cell phones, comprises a controller and a plurality of sensors. The system restricts device usage, while permitting emergency phone calls, for example 911 calls. The sensors receive transmissions from devices, and use the transmissions for identification and determining whether a device is within a restricted zone. One disclosed method is triangulation, using time of arrival of transmissions at the sensors. If the device is within the zone, the controller sends device identification, and possibly a customized restriction request, to a remote node, for example a control node of a cell phone network operator. The operator then uses its network resources to implement the requested restrictions. Communication between the controller and the remote node is secure, possibly encrypted, to minimize malicious interference. A wireless control can define vertices of the zone and exempt certain devices from restrictions. Jamming is not required.

9 Claims, 10 Drawing Sheets

Related U.S. Application Data continuation of application No. 13/763,638, filed on Feb. 9, 2013, now Pat. No. 8,965,341, which is a continuation of application No. 12/692,601, filed on Jan. 23, 2010, now Pat. No. 8,380,170, Substitute for application No. 61/170,626, filed on Apr. 19, 2009.

(60) Provisional application No. 61/168,610, filed on Apr. 12, 2009.

(51) Int. Cl.
| | |
|---|---|
| H04K 3/00 | (2006.01) |
| H04W 4/12 | (2009.01) |
| H04W 64/00 | (2009.01) |
| H04W 12/08 | (2009.01) |
| H04W 12/06 | (2009.01) |

(52) U.S. Cl.
CPC ........... *H04W 4/12* (2013.01); *H04W 12/08* (2013.01); *H04W 64/00* (2013.01); *H04K 2203/16* (2013.01); *H04M 1/72519* (2013.01); *H04W 12/06* (2013.01)

(58) Field of Classification Search
USPC .................... 455/550.1, 418, 411, 456.4
See application file for complete search history.

(56) References Cited

U.S. PATENT DOCUMENTS

| | | | |
|---|---|---|---|
| 5,952,969 | A | 9/1999 | Hagerman |
| 6,675,002 | B1 | 1/2004 | Lipovski |
| 7,050,755 | B2 | 5/2006 | Kline |
| 7,142,877 | B2 | 11/2006 | Lipovski |
| 7,194,273 | B2 | 3/2007 | Vaudreuil |
| 7,366,522 | B2 | 4/2008 | Thomas |
| 7,664,408 | B2 * | 2/2010 | Watanabe ........... G03G 21/1892 399/12 |
| 8,254,902 | B2 | 8/2012 | Bell |
| 8,606,227 | B2 * | 12/2013 | Karam .................. G06F 21/34 455/410 |
| 2004/0008113 | A1 * | 1/2004 | Pradhan ............... G01S 5/0289 340/539.26 |
| 2004/0179689 | A1 | 9/2004 | Maggenti |
| 2004/0203911 | A1 | 10/2004 | Masuda |
| 2005/0130671 | A1 * | 6/2005 | Frank ................... G01S 5/0252 455/456.1 |
| 2005/0173549 | A1 * | 8/2005 | Bash .................... G05D 1/0282 236/51 |
| 2005/0181808 | A1 | 8/2005 | Vaudreuil |
| 2006/0016175 | A1 * | 1/2006 | Pott ....................... F01N 13/009 60/285 |
| 2006/0038677 | A1 * | 2/2006 | Diener ............... G01R 29/0871 340/540 |
| 2006/0105758 | A1 | 5/2006 | Maislos |
| 2006/0217881 | A1 * | 9/2006 | Pei ......................... G09B 29/10 701/432 |
| 2007/0004413 | A1 | 1/2007 | Mahajan |
| 2007/0049264 | A1 | 3/2007 | Lipovski |
| 2008/0255725 | A1 | 10/2008 | Geisler |
| 2010/0073235 | A1 * | 3/2010 | Smith .................... G01S 5/021 342/451 |
| 2010/0167714 | A1 | 7/2010 | Howarter |

OTHER PUBLICATIONS

Ap; "Prison Officials Hindered by Pro-Cell-Phone Rules"; FOXNews.com; Oct. 22, 2008; article 0293344318600.
"The Silence of the Cellphones"; IEEE Spectrum, Apr. 2009, p. 14.
"Avoiding Tech Wrecks"; Dallas Morning News; Jan. 22, 2009; pp. 1D and 5D.
Campbel, Don; "Tweet! (You won't believe what I'm doing right now!)"; USA Today; Apr. 1, 2009; 11A.
Schwartz, John; "As Jurors Turn to Web, Mistrials Are Popping Up"; The New York Times; Mar. 17, 2009; printed from http://www.nytimes.com/2009/03/18/us/18juries.html?_r=2&hp on Apr. 13, 2009.

* cited by examiner

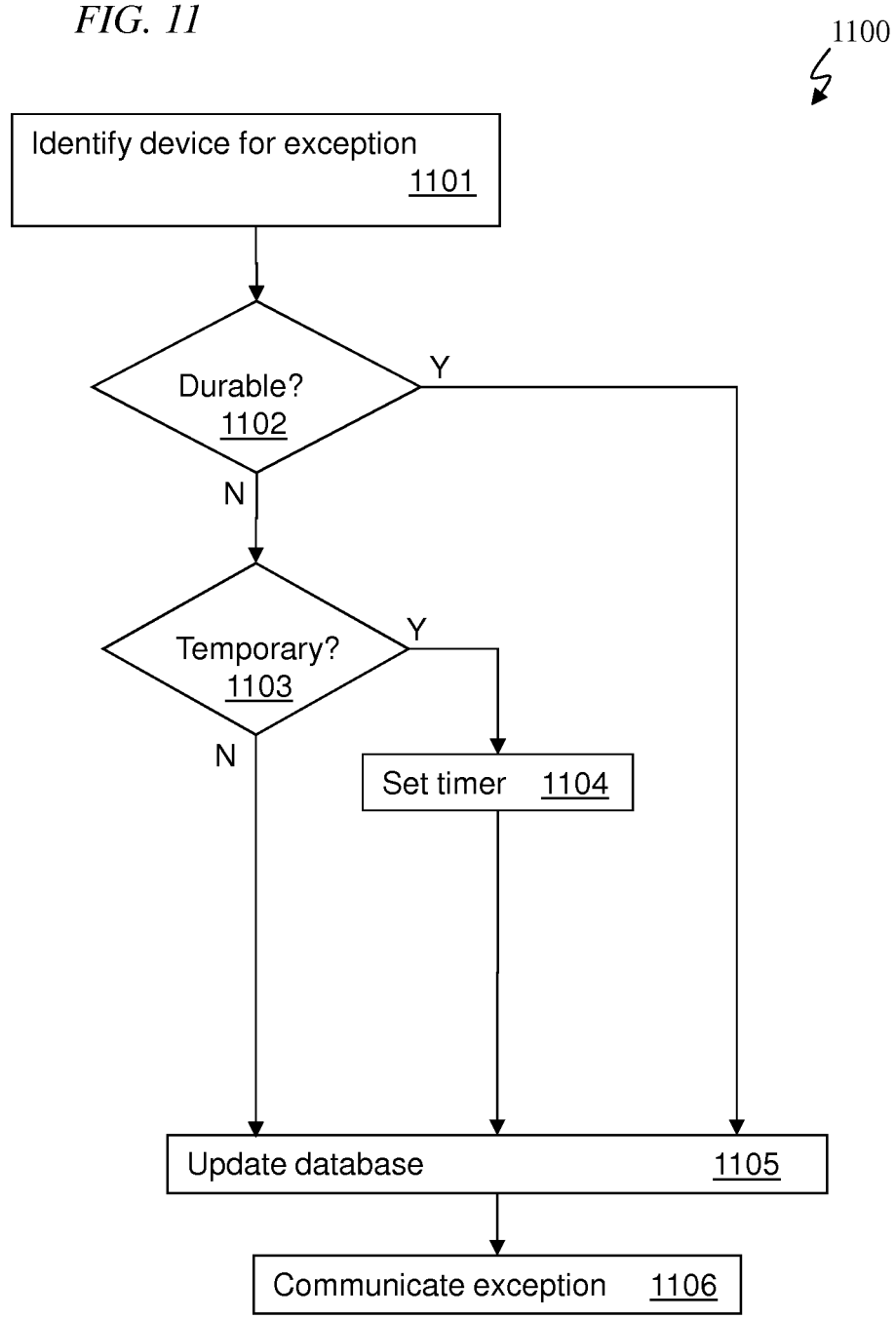

HACKER-RESISTANT DENIAL OF WIRELESS DEVICE OPERATION IN RESTRICTED AREAS

RELATED APPLICATIONS

This a continuation of U.S. patent application Ser. No. 14/446,316, filed on Jul. 29, 2014, which is a continuation of U.S. patent application Ser. No. 13/763,638, filed on Feb. 9, 2013, now U.S. Pat. No. 8,965,341, which is a continuation of U.S. patent application Ser. No. 12/692,601, filed on Jan. 23, 2010, now U.S. Pat. No. 8,380,170, and claims priority thereto, and further claims priority from U.S. Provisional Patent Application Ser. No. 61/168,610, filed on Apr. 12, 2009 and U.S. Provisional Patent Application Ser. No. 61/170,626, filed on Apr. 19, 2009.

TECHNICAL FIELD

The present invention relates generally to cellular device detection and control by a third party, and more particularly to limiting cellular device usage, within a defined control zone, to predetermined allowable actions.

BACKGROUND

"Please silence your cell phones." But people don't. Either they forget, or they're just plain inconsiderate. So, cell phones ring in theaters, libraries, during church services and even during funerals. Sometimes, the bright light of a cell phone screen can irritate movie-goers, if someone is typing a text message or email in an otherwise dark theater. The requests and signs, displayed in areas intended for a disturbance-free experience, simply do not work much of the time.

In other situations, cell phone usage has more dire consequences. Cell phones in prisons can facilitate criminal activity, enabling violent prisoners to plan escapes or control gang activity outside prison walls. An Oct. 22, 2008 Associated Press release, titled "Prison Officials Hindered by Pro-Cell-Phone Rules", documented a murder that was facilitated by a cell phone used within a prison. A Nov. 21, 2008 USA Today article, titled "Smuggled phones flourish in prisons—Federal law bans signal jamming", describes escapes, drug deals, and harassment of victims by prisoners using cell phones.

Prison officials are currently searching for ways to address the problem of cell phone usage within prisons and, according to both articles referenced above, some state officials have even considered the use of cell phone jammers that violate the Federal Communications Act. Besides their illegality, such jammers can also interfere with emergency calls, which can create new dangers.

The current situation, that state officials are considering violating federal laws and are willing to block even access to emergency services in some areas, in order to combat a more pervasive threat posed by cell phone usage, is clear evidence that there has been a failure by others to effectively curtail cellular device usage within defined control zones, while still permitting access to emergency services.

Further evidence, that there has been a failure of others to solve the problem of cell phone usage in certain areas, includes recent incidents of jurors using cell phones to surf the internet to look for outside evidence on a case. A Mar. 17, 2009 New York Times article, titled "As Jurors Turn to Web, Mistrials Are Popping Up", quoted the president of the American Society of Trial Consultants as stating "It's really impossible to control it."

Not any more.

BRIEF DESCRIPTION OF THE DRAWINGS

For a more complete understanding of the present invention, reference is now made to the following descriptions taken in conjunction with the accompanying drawings, in which:

FIG. 11 illustrates another method associated with restriction of wireless device operation.

DETAILED DESCRIPTION OF THE INVENTION

Figure 1:
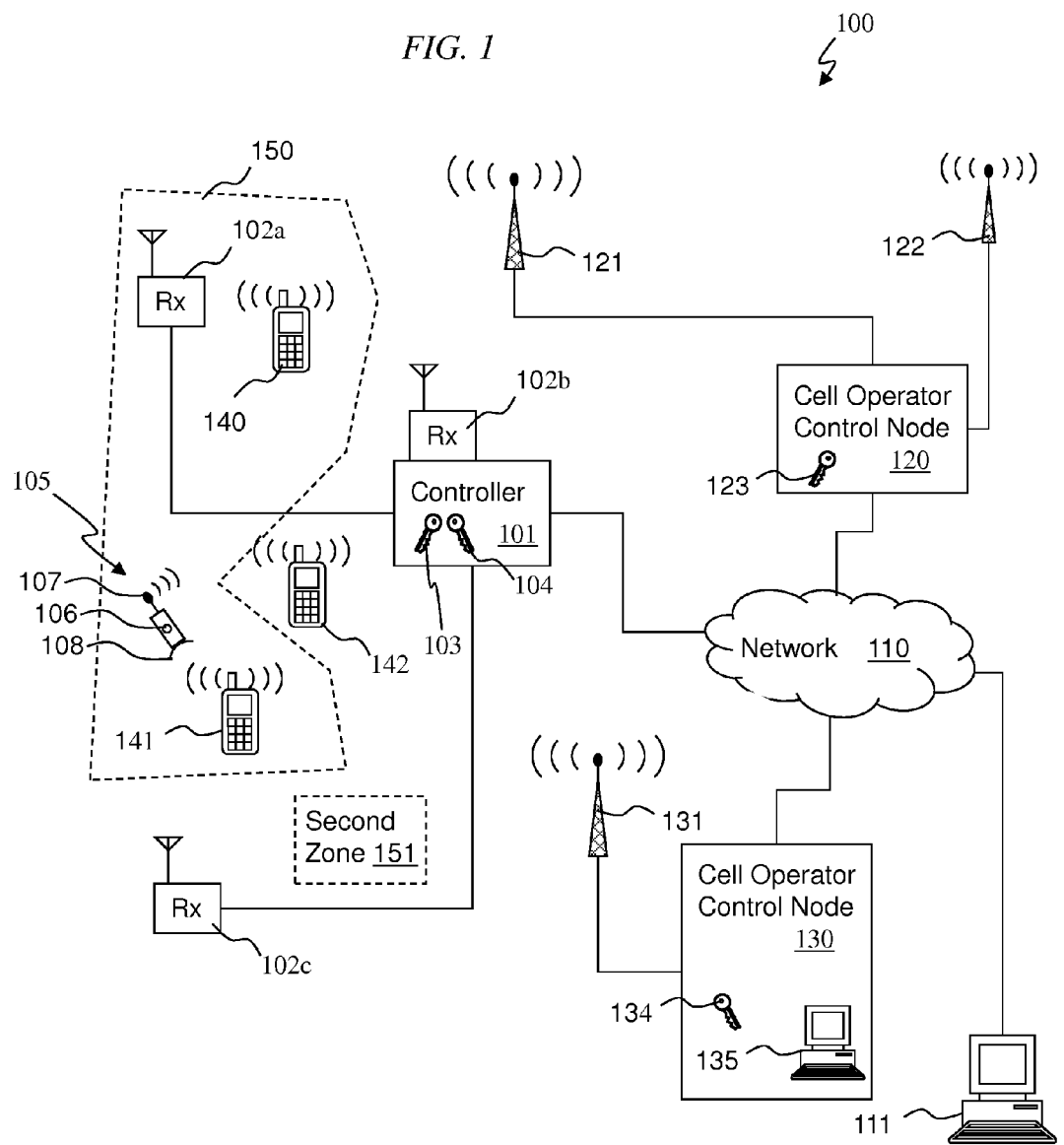
FIG. 1 illustrates an embodiment of a system for restricting operation of wireless devices.

FIG. 1 illustrates an embodiment of a system 100 for restricting operation of wireless devices, and includes an embodiment of a Cilense™ system. However, the prior art systems, illustrated in FIGS. 2 and 3, will be described first, in order to assist in understanding the novelty of the present invention.

Figure 2:
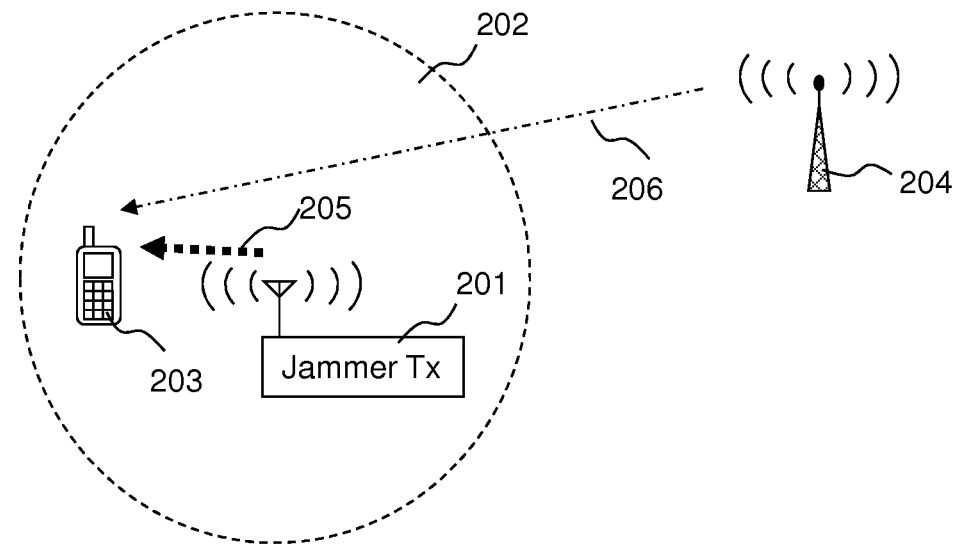
FIGS. 2 and 3 illustrate prior art systems for restricting operation of wireless devices.

FIG. 2 illustrates a prior art jamming device 201, which transmits high power radio waves to create an interference zone 202, intended to prevent usage of a wireless device 203, shown as a cellular phone. Other wireless devices could also be affected. Base station tower 204 would be the serving base station, if not for the operation of jammer 201. One principle of operation is that the radio signal 205 from jammer 201 overpowers the radio signal 206 from tower 204, preventing device 203 from properly processing any communications from tower 204. Alternatively, or additionally, jammer 201 could interfere with tower 204 receiving communications from device 203. Only one direction of the communication path between device 203 and tower 204 needs to be interrupted, in order to prevent usage of most cellular devices.

Figure 3:
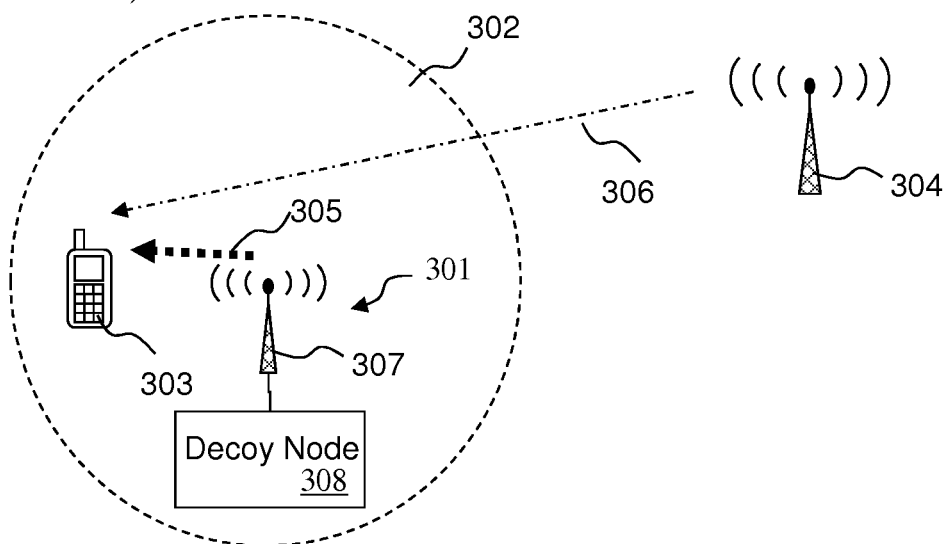

FIG. 3 illustrates a prior art decoy system 301, which tricks wireless device 303, shown as a cellular phone, into registering with a decoy base station node 308, thereby dropping communication with the proper serving base station tower 304. Decoy base station node 308 will not accept calls initiated by a user of device 303, and once device 303 has dropped registration with tower 304, any ongoing calls will be dropped and incoming calls from the operator of tower 304 will not connect.

The principle of operation is that within zone 302, the radio signal 305 from decoy base station transmitter 307 is stronger than the radio signal 306 from proper serving base station tower 304. Since older models of cell phones typically attempt to register with the strongest serving cell tower, this system relies on that programmed-in behavior to cause the cell phone to swap to decoy system 301, comprising decoy base station node 308 and decoy base station transmitter 307. Presumably, decoy base station node 308 has processing capability necessary to trick device 303 into completing a hand-off from proper serving base station tower 304 to decoy system 301.

Other systems use GPS signals, received by a cell phone, to determine whether a person is in a moving vehicle, and if so, to prevent the use of the cell phone. Still other systems rely on local transmitters to send a signal, which is received by the cell phone, to instruct the cell phone to restrict functionality.

All of these systems suffer from severe drawbacks. Jammers are illegal, and can present significant safety problems, because they prevent even critical, legitimate emergency calls, such as calls to 911 in the US. Jammers can also create interference that prevents operation of even devices that should not have their usage restricted. It is difficult to tailor the size and shape of a restriction zone controlled by a jammer solution. Further, multipath and shadowing effects can defeat a jammer, even sometimes within the intended restriction zone.

The decoy system is effectively impractical for many situations in need of a restriction zone. Transmitting on cellular telephone frequencies typically requires a government-issued license, and such activity is heavily regulated. Due to radio frequency interference issues, licenses may not be available for potential customers of a decoy solution. Decoy solutions also suffer from the same zone boundary definition problems as jammer solutions, as well as risks that multipath and shadowing effects will disable the decoy's ability to present a luring target for a device within the intended restriction zone. Users of both jammer and decoy solutions are likely to be inundated with complaints by their local area neighbors, as unwanted transmitted energy, from the jammer or decoy, spills out of the area that is under the ownership or control of the person or entity, who is entitled to create a restriction zone on their own property.

Further, decoy systems operate on an assumption that may not be valid in future generations of cellular devices. A possible change in the operation of cellular devices is that base station hand-off may not be based on which of multiple, nearby base stations provides the strongest signal, but rather, which one can provide the highest data rate or lowest bit error rate. This additional hand-off criterion requires significant additional complexity for a decoy system because, for a decoy system to function with such newer phones, the decoy will need to spoof replies to network communication parameter inquiries from the cell phone, with better answers than the legitimate serving base station. Otherwise, there may be no hand-off, even if the decoy provides a stronger signal.

Systems using GPS signals are subject to easy over-ride by a cell phone user, simply by disabling the GPS receiver. Also, at times when the cell phone's GPS receiver is enabled, but not tracking GPS satellites well enough to obtain a position or speed measurement, a GPS-based system simply will not work. Systems which rely on local transmitters to send a restricted-use signal to a cell phone, for example using ultrasonic waves or Bluetooth, are subject to over-ride if the cell phone user makes any modifications to the cell phone that interferes with the reception or processing of a restricted-use signal.

Returning now to FIG. 1, system 100 will be described. In contrast with the shortcomings of the described prior art, the inventive system described herein (a) does not cause radio interference for neighbors; (b) provides for an easily-tailored restriction zone—even a zone that can move at appreciable speeds, for example within an airplane passenger cabin; (c) does not rely on reception and processing by the wireless device of potentially unavailable signals, for example GPS signals; and (d) is not subject to such easy defeats, as described above.

Embodiments of the disclosed system for restricting operation of wireless devices, for example cell phones, comprise a controller and a plurality of sensors, for example three or more. Embodiments of the system can therefore restrict device usage, even while permitting emergency phone calls, for example 911 calls in the US and other emergency telephone numbers in other locations. The system operates remotely from a cellular base station site, and so may remain under control of an entity that is not a cellular network operator and does not have access to cellular base station site equipment.

The sensors receive transmissions from wireless devices, and use data within the transmissions to identify particular devices, for example device identification or registration data, which the device is transmitting to a base station. The transmissions can also be used to determining whether an identified device is within a restricted zone. One disclosed method is triangulation, using time of arrival of transmissions at the sensors, although other methods are disclosed, such as using transmission time slot information from time domain multiplexing systems, to estimate the range of a device from a sensor. For triangulating systems, sensor-to-controller communication delays are accounted for, to enable more accurate position calculation of the device. Direction of arrival may be used in some systems, by incorporating directional antennas in one or more sensors.

If a wireless device is within the restriction zone, the controller sends device identification, and possibly a customized restriction request, to a remote node, for example a control node of a cell phone network operator. The cell phone network operator then uses its network resources to implement the requested restrictions. This reduces the chance that user modification of the wireless device can defeat the operation of the system to restrict device usage.

In some embodiments, communication between the controller and the remote node is secure, possibly encrypted, to minimize malicious interference, for example from hackers who would attempt to disable the cell phone of someone who is not in a restriction zone, or prevent disabling of a device that is within a restriction zone. In some embodiments, a wireless control can define vertices of the zone, exempt certain devices from restrictions or customize restrictions, and even assist with calibrating sensor positions during system setup.

System 100 comprises a controller 101 and three sensors, 102a-102c, each of which includes a radio receiver capable of intercepting signals from cellular devices 140, 141, and 142. Additional sensors may be used. Each sensor should have a way to uniquely identify itself to controller 101, such as by using a sensor-specific communication channel, or providing some type of encoding on data sent to controller 101. In the illustrated embodiment, sensors 102a and 102c are illustrated as being coupled to controller 101 with lines. The coupling between sensors 102a-102c may be wired or wireless, including radio and infrared data links. Sensor 102b is illustrated as attached to controller 101. In some embodiments, a sensor may be attached physically to a controller, for ease of transportation and setup, although this is not required.

Controller has two defined restriction zones, zone 150 and zone 151, which is separate from zone 150. This is possible because, in the illustrated embodiment, controller 101 can enforce multiple, arbitrarily-shaped restriction zones. The restriction zones are defined within the memory of controller 101. When the position of a wireless device is calculated, controller 101 determines whether that wireless device is inside or outside of a restriction zone. As illustrated, wireless devices 140 and 141 are within zone 150, while wireless device 142 is outside of both zones 150 and 151, even though device 142 is within a triangle defined by the positions of sensors 102a-102c. It should be noted that, since even positions can be determined for wireless devices that are outside of a triangle defined by the positions of sensors 102a-102c, zone 150 extends past sensor 102a.

Simple triangulation schemes could be used, which have lower computational requirements, such as systems that define a restriction zone such that the sensors comprise the vertices of the restriction zone. A nearly arbitrarily-shaped zone can be created with such a system, by using a plurality of sensors, such that each combination of three sensors forms a sub-zone. Thus, a rectangular exclusion zone could be formed using four sensors, A, B, C, D, with A, B, C forming the vertices of one triangular sub-zone, and B, C, D forming the vertices of a second, adjacent triangular sub-zone.

Because devices 140 and 141 are inside zone 150, controller 101 will identify them, using their transmissions to base station towers 121 and 134, which are intercepted by one or more of sensors 102a-102c. Controller may also obtain identification information for device 142, because it is in range of at least one of sensors 102a-102c. Since cell phones identify themselves when attempting to register with a base station, or initiate a communication session, and typically radiate in multiple directions, controller 101 can listen to the attempted registration or communication date traffic, and identify the devices using information available to base station towers 121 and 122. The identification information for at least devices 140 and 141 will be communicated to the cellular network operators, so that the cellular network operators can restrict communication between their base station and any devices that are using that operator's network.

These restrictions may include blocking voice calls, while allowing emergency calls, blocking outgoing text (SMS) messages, blocking incoming text messages, and blocking other data transactions, such as incoming and outgoing non-voice communication. Additional restrictions could be blocking voice calls, either incoming or outgoing, unless they are on a list of pre-approved numbers. Other restrictions could be that calls are blocked unless an urgent call fee is paid to allow the urgent call through. This enables urgent calls in some restriction zones, but provides an incentive for the users to minimize their time and duration. The urgent call fee may be per call, with an optional per-minute additional charge. This potential revenue stream can serve as an incentive for cellular phone network operators to comply with a third party request to block a call to a customer. Some restrictions may be that a predefined total talk time is permitted, or a pre-approved number of calls and texts may be permitted. In some embodiments, non-communication functionality may be restricted, for example, in dark areas, having a brightly illuminated screen may be a distraction.

Other restrictions could be that phones are set to vibrate mode, automatically, just in case the owners forget to do it themselves, but calls are still permitted though. Then considerate people, aware that a call is coming in, can move to a more secluded area to take the call. However, non-communication functionality restriction may require that the wireless device receive and comply with an instruction, from either the cellular operator network or controller 101, to restrict the functionality.

The restrictions are possible to implement in cellular network equipment, because the cellular networks handle the communication traffic received at a base station tower from a cellular device. Typical cellular networks already have the ability to block traffic from a particular cellular device upon, the device owner's account being suspended for non-payment of a bill. Yet, even for such an account suspension emergency calls, for example calls to 911 in the US, are still supported. Upon receiving a request from controller 101, a cellular network operator can perform actions somewhat similar to those taken for a delinquent account, but on a considerably shorter term basis.

Controller 101 has security tokens, for example encryption keys 103 and 104, which may comprise keys for symmetric encryption, asymmetric encryption, or both. This is because, in the illustrated embodiment, controller 101 is connected to a cellular network operator control node 120 and a cellular network operator control node 130 through a public computer network 110. Nodes 120 and 130 have counterpart keys 123 and 134, respectively. Public computer network 110 may be the internet, which is filled with malicious threats. For example, hacker computer 111 is also connected to computer network 110. If a more private connection was available, for example a dedicated connection between controller 101 and node 120 or node 130, it might be a desirable solution, based on security requirements. This is because hacker computer 111 could be used to undermine the operation of controller 101, for example by sending modified usage restriction requests for a particular wireless device to one of nodes 120 and 130, or by spoofing one of nodes 120 and 130, so that controller 101 sends restriction requests and device identity information to hacker computer 111, instead of nodes 120 and 130. Without proper safeguards, an external hacker could either prevent system 100 from functioning, or maliciously cause a wireless device to endure restricted operation, even if it is outside all restriction zones. Further, controller 101 may include a decoy ad-hoc network node, so that if device 140 attempted to set up a self-assembling network with device 142, to leverage the connectivity of device 142, this attempt would be frustrated. Controller 101 could also send out instructions to devices 140-142, and any other devices within range, to disable self-assembling or any other ad-hoc network capability, in order to isolate device 140. However, if controller 101 continues its self-assembling network attempts, it can identify any of devices 140-142 that are not complying with the network disabling, and then request that nodes 120 and 130 restrict operation of the non-compliant devices.

Node 120 is connected to serving base station tower 121 and distant base station tower 122 through a cellular network infrastructure. Serving base station tower 121 is the base station that serves wireless devices in the area of zones 150 and 151, whereas tower 122 is a on the same network, but likely too far away to provide service in that area. Tower 122 could be a metacell though, that provides fill-in coverage for areas shadowed from tower 121, and thus could cover portions of zones 150 and 151. Node 130 is similarly connected to serving base station tower 130. Multiple cellular operator nodes and serving base station towers are illustrated, because different cellular network operators often use different towers and different control nodes to serve overlapping geographical areas. Thus, node 120 is owned and operated by one cellular carrier, and node 130 is owned and operated by another.

If controller 101 cannot determine which carrier is associated with a particular one of devices 140 and 141, identifying information for both devices 140 and 141 can be sent to both nodes 120 and 130. The computational equipment at each of nodes 120 and 130 can then identify whether device 140 or 141 is a subscriber device being served by that network and, if so, take the requested blocking actions. Otherwise, if nodes 120 and 120 do not recognize one of devices 140 and 141, the request for that device can be ignored.

In order to provide the service of blocking data traffic for a subscriber, upon the request of a third party, the cellular network operators must have both some motivation to comply, as well as some degree of certainty that the request is coming from a valid source. For places such as prisons, courthouses, streets within school zones, other areas where cell phone usage can impact public safety, and even temporary locations with visiting dignitaries, operator compliance may become a legislated requirement. For non-legislated blocking, the fee arrangement for urgent calls, described above, may provide some motivation. Even with a government-mandated compliance policy though, the network operator will still request reasonable assurance that the request for restricted operation of a device is coming from an authorized source.

One option for ensuring authorization is that, when controller 101 moves into a new area, it registers with all of the operators who are operating towers in the area. Network operators then have a database of the operational systems, such as controller 101, which are associated with towers in close proximity. Part of this process may include the exchange or distribution of encryption keys or other security tokens, so that the controller and the network control nodes may engage in a challenge-response process when setting up a channel to communicate restriction requests. There may also be responses from the network nodes, acknowledging the requests and indicating compliance or refusal to comply. If the messages and responses are encrypted, then encryption provides not only security from eavesdropping by a hacker, but proper decryption indicates authenticity of the claimed sender. Public key encryption can be used, so that each a tower (such as 121, 122 and 131) can digitally sign its recent transmitted security code, and controller 101 can digitally sign its request. This provides 2-way authentication between controller 101 and one of the nearby network operators.

Other options include that the towers, such as 121, 122 and 131, send a security code that changes rapidly, and information from this security code must be included with a restriction request as a time-changing security authentication credential, so that only systems having a reception capability within the vicinity of a serving tower can send a valid request for device operation restriction. Using this option, controller 101 may need to identify the base stations attached to towers 121, 122, and 131, or at least those providing signal strength sufficient to serve cellular devices within at least a portion of zones 150 and 151. Network operators can reduce their vulnerability to replay attacks by requiring that a recent security code, sent out from one of its towers, be used in construction of the restriction request. This can include using a hash value of a transmitted security code as an encryption key for at least a portion of data sent by controller 101, and other authentication schemes. A replay attack could occur if hacker computer 111 intercepts a message from controller 101 to node 120, stores it, and then transmits it to node 120 at a later time. The result would be that a device could have restricted operation, even if it moved outside zone 150. Having time-varying security codes, along with a cellular network operator verifying that a device had been recently registered to a base station in proximity of controller 101, can reduce the likelihood that malicious attempts to interfere with the proper operation of system 100 will be successful. Thus, a network operator may verify that a request from controller 101 include recent security information transmitted from a network tower operated by the network operator, along with security information identifying controller 101, prior to complying with any request. Since the network operator knows the location of each of its towers, if a first request associated with a first tower came in from a device purporting to be controller 101, and then another request associated with a second tower, that was far removed from the first tower, arrived immediately afterward, the network operator might suspect the presence of a hacker attempting to maliciously disable cellular devices and not comply with the request. However, since a legitimate controller might be mobile, such as within an airplane, boat, train or bus, some means is needed to ensure that a controller can be registered with the network operator to be within the vicinity of different towers at different times. For mobile versions of controller 101, controller 101 would need to register with networks automatically under circumstances similar to a cellular device tower hand-off, except controller 101 would register with multiple carriers and possibly multiple towers of the same carrier, simultaneously.

Other security considerations include controller 101 informing the users of devices 140 and 141 whether they are restricted, and possibly also the user of device 142 that it may be restricted if device 142 enters nearby zone 150. Part of this communication could include controller 101 identifying itself to the affected devices 140-142, for example, by communicating an identification code, associated with controller 101.

In the illustrated embodiment, encryption keys 103 and 104, installed in controller 101, can be used to communicate securely with nodes 120 and 130. Key 103 is a security counterpart to key 123, so that using keys 103 and 123, controller 101 and node 120 can communicate securely. Similarly, key 104 is a security counterpart to key 134, so that controller 101 and node 130 can communicate securely. If public key encryption is used, controller 101 could encrypt messages for both nodes 120 and 130 with the same private, asymmetric key. This provides authentication, but maybe not privacy, because anyone having a copy of the public, asymmetric key could decrypt the messages and learn which wireless devices are within zones 150 and 151. It may be desirable to restrict public access to this information. However, if the public asymmetric key is only "public" to nodes 120 and 130, then an asymmetric key system could work.

Embodiments of a controller, such as controller 101, may send requests in various ways. Controller 101 may simply forward device identification, which nodes 120 and 130 will interpret as a request to enforce pre-arranged default usage restrictions. Another option may be to identifying specific restrictions, such as permitting some functionality out of SMS, email, voice, and other data exchanges, while blocking others. Multiple options also exist for relaxing, or lifting usage restrictions, when a device moves from inside zone 150 to the outside. Nodes 120 and 130 may operate in such a manner that the restriction requests time out after a predetermined period, for example a minute, and if another restriction request has not been received from controller 101 by that time, the restrictions are lifted. In this situation, controller 101 repeatedly communicates identifying information for devices 140 and 141, within zone 150, to one or both of remote nodes 120 and 130, for however long both of devices 140 and 141 remains within zone 150. Upon a device moving outside of zone 150, controller 101 merely fails to update the identification. The time-out will expire, and the device that moved outside of zone 150 will resume operation upon the expiration of the time-out period. Alternatively, controller 101 could affirmatively inform one or both of nodes 120 and 130 that a device has moved outside a zone, so that service to that device can resume more rapidly.

System 100 also comprises a wireless user control 105, although in some embodiments, a user control may have a wired connection to controller 101. User control may be used for a plurality of functions, including (a) calibrating the locations of sensors 102a-102c during system setup or maintenance, (b) defining vertices of restriction zones 150 and 151, and (c) identifying a particular wireless device, such as device 141, for exemption or modified restriction rules. For example, if restriction zone 150 encompasses a prison, device 141 may belong to someone who is authorized to carry a cellular device into the area, for example a guard or an attorney visiting a client. For some embodiments, the different functions may be accomplished with different controls. In some embodiments, controller 101 will support multiple user controls 105. For security, controller 101 and user control 105 may encrypted communications between them. Additional security arrangements and data compression, applicable to both wireless and wired network communications, should also be considered for improving system 100.

User control 105 includes a user input control 106, which may include a plurality of buttons, a touch screen, a trackball, or any suitable input system for receiving input from a user. Input functions may include triggering a calibration function within the controller, to identify the location of a sensor. For example, during setup and initial calibration, a user may position sensors 102a-103c, then visit each of the sensors in turn, actuating user input 106, when the user control 105 is in close proximity with a sensor, to transmit a calibration signal from user control 105 to sensors 102a-102c. If user control 105 is adjacent to sensor 102a, then sensor 102a will be the first to receive any calibration signals transmitted by user control 105, possibly through wireless communication system 107. Communication system 107 may also be used to communicate with controller 101.

By measuring the time delay to the other sensors, 102b and 102c, the relative distance between sensors 102a and 102b, as well as the relative distance between sensors 102a and 102c may be determined. By then moving user control 105 to be adjacent to sensor 102c, and repeating the calibration signal transmission process, the relative distance between sensor 102c and 102b may further be determined.

Calibrating the sensor positions in this manner may result in controller 101 calculating different time of arrival information from sensor 102a to sensor 102c than the reverse path, from sensor 102c to sensor 102a. This is because the communication delays between controller 101 and each of sensors 102a and 102c may be different. There are a number of options for compensating for this delay. One is to use only relative communication delay differences. Another is to use precise knowledge of communication delay between one of the sensors 102a-102c and controller 101, to calculate exact delay for each of the sensors 102a-102c. This second option is easier if predetermined cable lengths, with known propagation delay times, are used, and if the sensors' and controller's response times are also known. If sensor 102b is attached to controller 101 and connected with a hard-wired communication interface, then moving user control 105 adjacent to sensor 102b and repeating the calibration transmission process can provide the final data needed for the position calibrations. If none of the absolute communication delays are known, then relative delay information must be used.

For calibration at sensor 102a, the absolute time delays are Ta=Ca; Tb=Cb+Pab; Tc=Cc+Pac, where Ta is the time delay between sensor 102a receiving a calibration signal from user control 105, and controller 101 receiving it, Ca is the communication delay between sensor 102a and controller 101; Tb is the time delay between sensor 102b receiving a calibration signal, and controller 101 receiving it, Cb is the communication delay between sensor 102b and controller 101, Pab is the propagation delay between sensor 102a and sensor 102b; and Tc is the time delay between sensor 102c receiving a calibration signal, and controller 101 receiving it, Cc is the communication delay between sensor 102c and controller 101, Pac is the propagation delay between sensor 102a and sensor 102c. The propagation delay between user control 105 and sensor 102a is assumed to be zero, for simplification. Propagation delay is the physical distance, multiplied by the speed of light, which is a constant value. Thus, distance measurements may be obtained easily, once propagation times are calculated.

The relative delays, calculated by controller 101 are Tab=Cb+Pab−Ca and Tac=Cc+Pac−Ca, where Tab is the time between the calibration signal arriving from sensor 102a and sensor 102b, and Tac is the time between the calibration signal arriving from sensor 102a and sensor 102c. If the communication delay from sensor 102a is long enough, either or both of Tab and Tac may be negative.

For calibration at sensor 102b, the absolute time delays are Ta=Ca+Pba; Tb=Cb; Tc=Cc+Pbc, and the relative time delays are Tba=Ca+Pba−Cb and Tbc=Cc+Pbc−Cb. For purposes of calibration, Pba can be assumed to be identical to Pab. Thus, Tab, the delay between sensors 102a and 102b when calibrating at sensor 102a, will differ from Tba, the delay between sensors 102a and 102b when calibrating at sensor 102b, by twice the difference between Ca and Cb.

For calibration at sensor 102c, the absolute time delays are Ta=Ca+Pca; Tb=Cb+Pcb; Tc=Cc, and the relative time delays are Tca=Ca+Pca−Cc and Tcb=Cb+Pcb−Cc. For purposes of calibration, Pca can be assumed to be identical to Pac, and Pcb can be assumed to be identical to Pbc. Thus, Tac, the delay between sensors 102a and 102c when calibrating at sensor 102a, will differ from Tca, the delay between sensors 102a and 102c when calibrating at sensor 102c, by twice the difference between Ca and Cc. Similarly, Tbc, the delay between sensors 102b and 102c when calibrating at sensor 102b, will differ from Tcb, the delay between sensors 102b and 102c when calibrating at sensor 102c, by twice the difference between Cb and Cc.

If at least one of Ca, Cb, and Cc is known, then the others may be calculated using measured Tab, Tba, Tac, Tca, Tbc, and Tcb. For simplification, assume sensor 102b is attached to controller 101 by a short enough cable that Cb can be approximated as zero. Ca is then just half of the difference between Tab and Tba, and Cc is half of the difference between Tbc and Tcb. In this manner, baseline calculations can be made that are needed for later triangulation calculations.

As an alternative calibration scheme, one or more of sensors 102a-102c could have a calibration transmitter, which is triggered by controller 101. This could be useful if frequent position calibration is expected, or the sensors are in positions that are difficult to reach, and it is inconvenient to send someone to visit each sensor, whenever a calibration is needed. For this scheme, which is made easier if sensor 102b is co-located with controller 101, so that Cb is small enough, controller 101 sends out instructions to each of sensors 102a and 102c, I turn, instructing them to transmit a calibration signal. The delays can be calculated similarly as described for calibration with user control 105.

The next process in the setup of the illustrated embodiment is defining restriction zones. Defining zone 150 can be accomplished by moving user control 105 to each of the vertices of the desired restriction zone, and actuating user input 106. One method to define the zone would include circumnavigating the desired zone in a single direction, and actuating user input 106 at each desired vertex. The positions of user control 105 at each vertex can be calculated by triangulation, or whatever other method is employed for position calculation by system 100. Then, the final vertex can be connected, within a zone boundary database in controller 101, to the first vertex. The process can be repeated, if additional restriction zones, for example second restriction zone 151, are desired.

After system 100 is set up and operating, it may be desirable to make exceptions to the typical set of restrictions. For example, device 141 may be treated by system 100 differently than device 140. To enable this, user control 105 has a short range, directional wireless sensor 108, which enables identification of a wireless device in close proximity, and on the proper side of, user control 105. Actuating user input 106, when pointing user control at nearby device 141, then flags to controller 101 that device 141 is to be treated differently than device 140. The restrictions may be more severe, more lenient, or even totally waived. Thus, user control 105 and controller 101 are jointly configured to identify a device for restriction exceptions when user control 105 is in close proximity with the device. This need not be after controller 101 has already requested restricted device operation. It could occur prior to a device entering a restriction zone, so that, when the device enters the zone, the initial restriction request is already modified or won't be sent.

One example use would be in a dark theater, in which the restrictions are not to block calls, but rather that all phones are set on vibrate mode. This allows people within the theater to be aware that someone is calling, and to step outside to take the call. However, one person may not be so considerate, and may be speaking loudly during a call. If a theater worker requests that the person be quiet, and that person does not comply, then the theater worker can use user control 105 to instruct controller 101 to request odes 120 and 130 to terminate the call. A similar arrangement can be used for people having excessive text message conversations in a dark theater, while not making reasonable accommodations to limit the bright light shining in other people's eyes. A theater worker can then easily disable the text message ability of the phone, until the owner steps outside the restriction zone, and controller 101 releases the cell phone from the restrictions. Enhanced or relaxed restrictions for a particular device may be permanent, for the duration that the device is within the restriction zone, or temporary, so that enhanced or limited privileges expire before the device leaves the restriction zone.

Other methods for determining the positions of devices 140-142 exist, which could be used if all three of sensors 102a-102c are not able to simultaneously pick up transmissions. If devices 140-142 operate using time domain duplexing (TDD) or time domain multiple access (TDMA), they will have an assigned transmission time slot, controlled by the serving base station's clock. Using the assumption that the device will begin to transmit at its scheduled time, and if controller is synchronized to the same clock, a range from the device to a sensor can be estimated. This gives a radial distance from one sensor. If two sensors can intercept the transmission, then radial distance measures from two sensors can be compared, and may allow determination of whether a device is within zone 150.

Multipath effects make using direction of arrival an unreliable sole source of information. This is because a bounce path, from a different direction than the true direction from a sensor to a wireless device, could provide a stronger signal. However, even in this situation, the true path will provide the earliest signal. Making direction of arrival measurements requires directional sensors, which can be provided with an antenna array arrangement on one of the sensors. If each of the multipath signals received by a sensor is compared against the others, not only for power levels, but also for time of arrival, then direction of arrival information can be used to assist with location. For example, consider the possibility that sensor 102c does not receive a transmission from device 141. Attempting to calculate the position of device 141, using merely time of arrival information for signals received by sensors 102a and 102b, will result in two possible locations for device 141. One position will be in its illustrated position, within zone 150. The other position will be outside zone 150, slightly above and to the left of the illustrated position of tower 121. Using direction of arrival information, if sensor 120b is able to identify that device 141 is located counter-clockwise from a reference line between sensors 120a and 120b, or sensor 120a is able to identify that device 141 is located clockwise from that same reference line, then the position of device 141 can be fixed as within zone 150 and not nearby tower 121. The law of cosines is a well-known equation that can be used using a combination of range and angle information, and a related derivation can also be applied in some situations using only range information.

Ascertaining identifying information of a device, or determining an identity of a device, by controller 101 may not involve determining a unique number or address associated with a device. Identification information for a wireless device may be data uniquely associated with a wireless device, such as an assigned phone number or an address, but may also be other identifying information, such as general information that is specific enough to enable a remote processor to ascertain the identity of the device. Examples include a time of a recent transmission, a copy of recently transmitted data, transmission channel information, and physical location relative to nearby towers. Thus, if controller 101 can communicate that device 141 recently transmitted a certain data stream, even if the data stream were encrypted and controller 101 could not interpret the contents, and that device 141 was likely visible to a certain sector of tower 131, then controller 101 has provided enough information that processor 135 at node 130 could potentially identify that controller 101 was referencing device 141—if node 130 is within the network that device 141 is using. If device 141 was using the other network, node 120, then node 120 would be able to identify device 141. Processor 135 may therefore need to maintain a history of recently received data from served wireless devices, and have other logic necessary to determine a specific device from a description of its behavior, which is received from controller 101. In some situations, controller 101 may be able to ascertain unique data associated with a wireless device, for example, possibly if a device were to attempt to register with a base station, if nodes 120 and 130 shared information with controller 101 about devices registered with towers 121 and 131, to enable exact device identification, or if controller 101 were connected to a decoy node, such as node 301, illustrated in FIG. 3.

Figure 4:
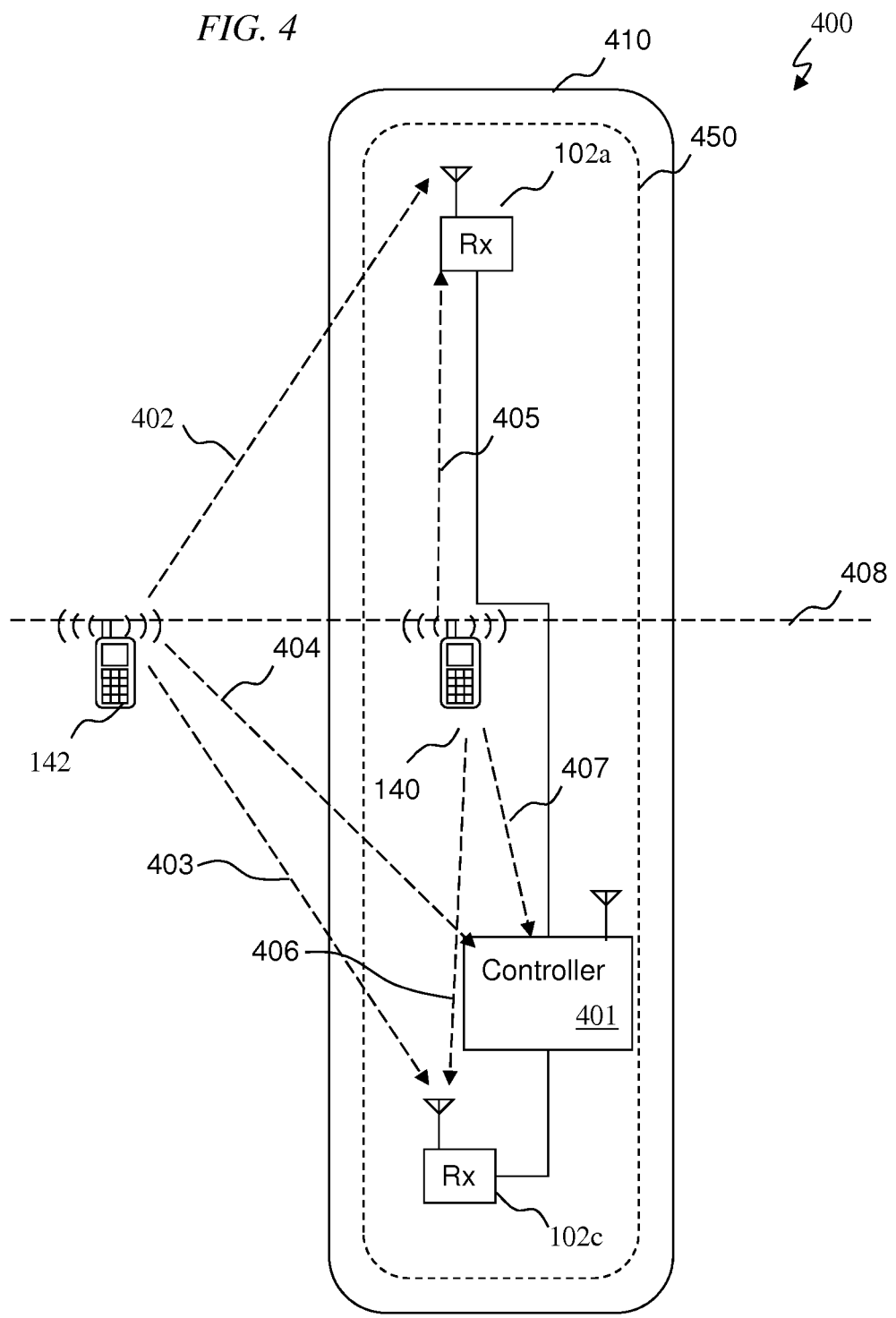
FIG. 4 illustrates another embodiment of a system for restricting operation of wireless devices.

FIG. 4 illustrates another embodiment of a system 400 for restricting operation of wireless devices, for example in an airplane passenger compartment 410. This illustrated system 400 can help enforce an airline policy that passengers turn off phones when airplane is ready to take off. As an added bonus, the restriction zone 450 actually moves along with airplane 410, automatically. In airplane passenger compartment 410, system 400 comprises controller 401 and remote, external sensors 102a and 102c, which can all operate within a moving vehicle. A third sensor is integrated within controller 401. Controller 401 uses its antenna to wirelessly communicate with nodes 120 and 130 though network 110, while operating within a moving vehicle, such as within airplane passenger compartment 410, while the airplane is moving away from a passenger boarding gate.

To highlight the need for multiple sensors to solve positions using time of arrival information alone, as inputs to triangulation calculations, consider the possibility that controller 401 has not activated its internal sensor. As before, the user of device 140 is within a restriction zone, but this time it is zone 450, because the user of device 140 is a passenger. The user of device 142 is outside the plane, possibly waiting to board. Assume, for this explanation, that transmissions from device 142 can enter airplane passenger compartment 410, possibly through the windows. In this situation, when the airplane flight crew wishes to restrict cell phone operation, device 140 should be restricted, but device 142 should not be.

As illustrated, the distance 402 between device 142 and sensor 102a is the same as the distance 403 between device 142 and sensor 102c. Similarly, the distance 405 between device 140 and sensor 102a is the same as the distance 406 between device 140 and sensor 102c. Thus, the time of arrival differences between sensors 102a and 102c are identical for both devices 140 and 142. Controller 401 will then calculate the positions of both devices 140 and 142 to be on the same set of possible points. These points will form a plane, exactly half way between sensors 102a and 102c, and perpendicular to a straight line connecting sensors 102a and 102c. As viewed from above, according to the perspective of the illustration, this plane becomes straight line 408. Thus, the position of a wireless device at any point on line 408 will be indistinguishable from the position of any other device at a different point that same line 408. Line 408, in two dimensions, is a line of ambiguity. Considered in three dimensions, it is a plane of ambiguity.

Now, adding the time of arrival measurement for a sensor within controller 401, distance differences become apparent. The distance 404 between device 142 and controller 401 is shorter than distance 403, but not by much. In contrast, the distance 407 between device 140 and controller 401 is considerably shorter than distance 406. Thus, using the difference between distances 407 and 406, controller 401 can determine that device 140 is inside zone 450, while using the difference between distances 404 and 403, controller 401 can determine that device 142 is outside zone 450. Controller 401 can just use a threshold as decision criteria, based on the maximum distance difference for a hypothetical device exactly on the boundary of zone 450.

It should be noted that, even with this third measurement, if only time of arrival information is available, controller 401 cannot necessarily determine which side of airplane passenger compartment 410 that device 142 may actually be. If controller 401 is positioned poorly, for example, it is positioned on a straight line between sensors 102a and 102c, the ambiguity plane for the position of device 142 will become an ambiguity circle on the former ambiguity plane, centered on a line connecting sensors 102a and 102c, with a radius determined by the difference between distances 403 and 404. This ambiguity circle will surround airplane passenger compartment 410, but if airplane passenger compartment 410 is the nearly-circular cross-sectioned tube, typical for airplanes, then controller 401 will properly determine that device 142 is outside zone 450. That is, even if controller 401 cannot determine whether device 140 is to the left, right, above, or below airplane passenger compartment 410.

Fortunately, for many situations, controller 401 can operate with the assumption that all wireless devices are at approximately the same height. This assumption is valid enough in open air areas, such as wide, flat, level fields where most people are standing on the ground at the same height, and vertical variations are minimal in comparison to horizontal positional variations. In tall, multi-level buildings though, vertical displacement can be an issue. Systems operating in those environments will require more sensors to solve vertical displacement ambiguities. In order to solve vertical displacement ambiguities, there must be some vertical diversity in the sensors. Merely adding more sensors in the same plane will not solve ambiguities as to whether a device, not in the same plane as all of the sensors, is above or below that plane.

Figure 5:
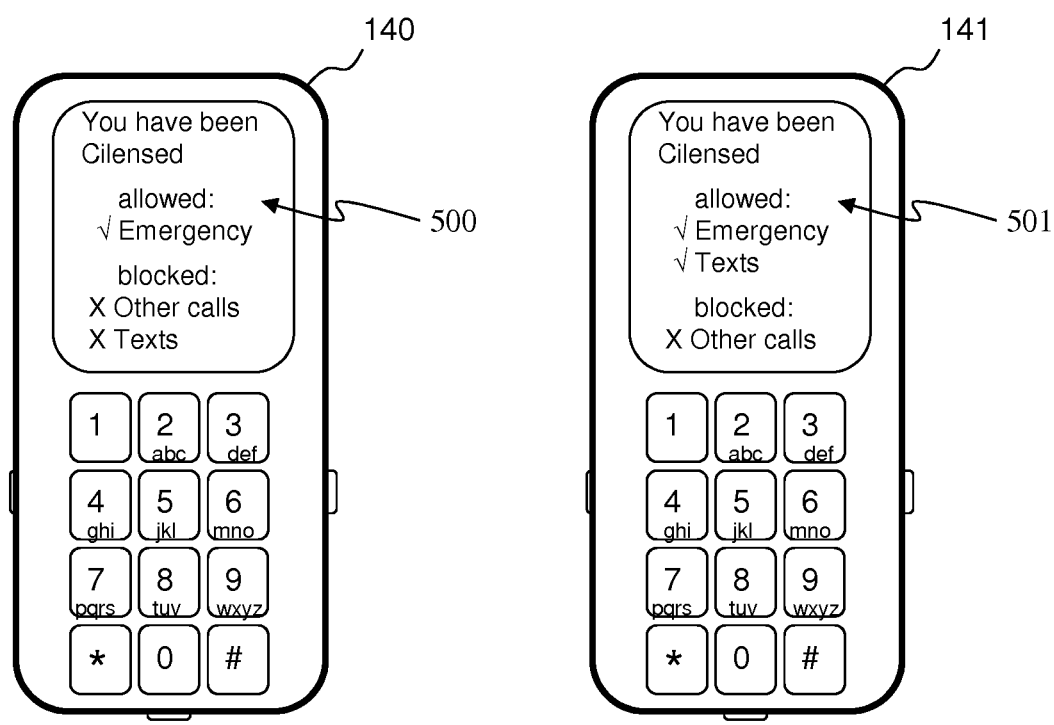
FIG. 5 illustrates wireless devices showing indications of restricted operation.

FIG. 5 illustrates wireless devices 140 and 141 showing indications of restricted operation. Wireless device 140 is displaying a message 500, indicating that emergency calls are allowed, but other phone calls and text messages are not allowed. The message could have been triggered by communication from controller 101 or one of nodes 120 and 130. Other information could be displayed, including whether vibrate mode has been activated, or whether email and internet access are affected, and whether non-communication functionality has been restricted. Wireless device 141 displays a message 501, indicating different restrictions than are imposed on device 140. This may be because device 140 had been pre-registered with controller 101, for lesser restrictions than device 140, prior to entering zone 150, or because the exception process, described above in the discussion of FIG. 1, had been performed after device 141 had already been restricted similarly to device 140.

Figure 6:
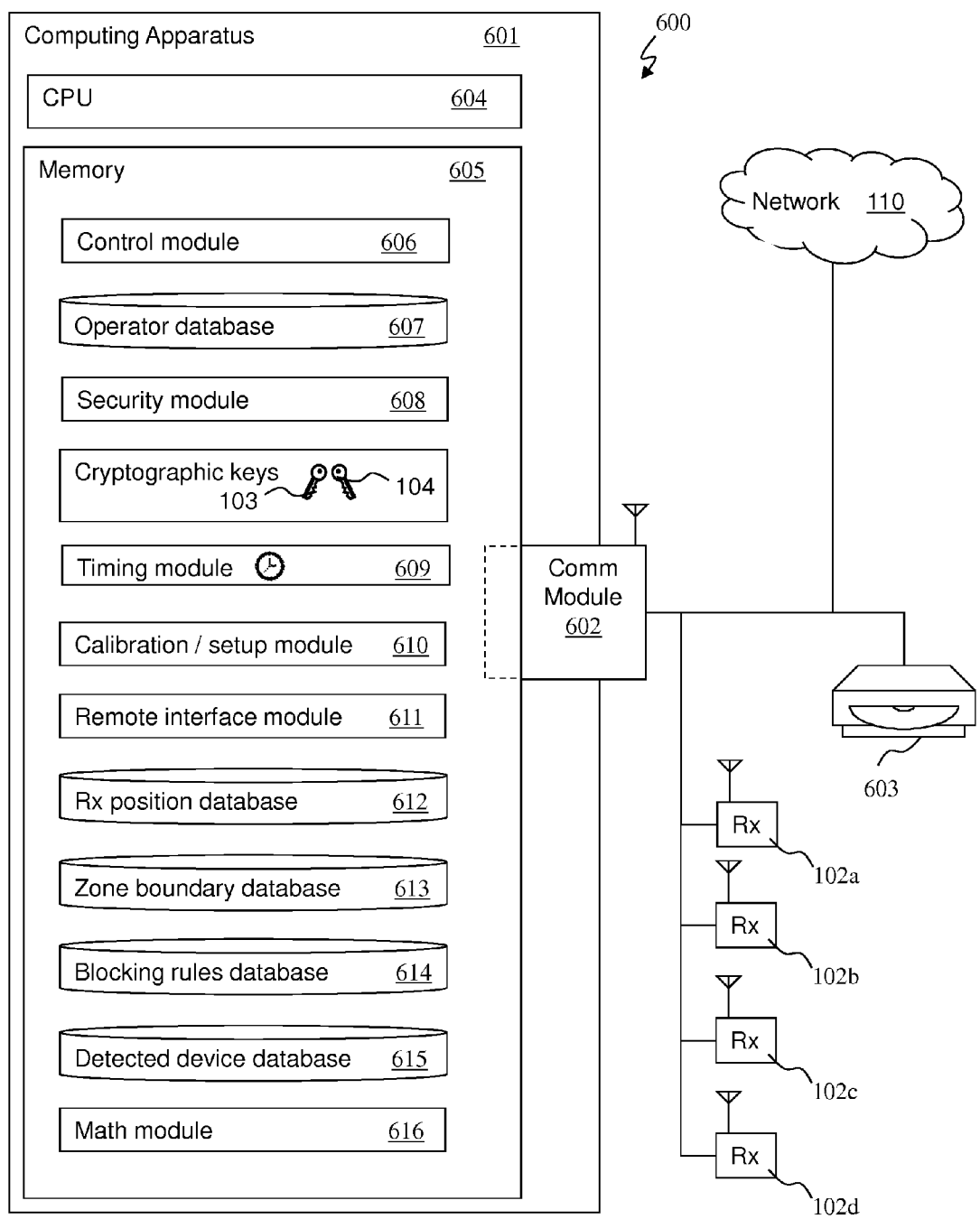
FIG. 6 illustrates another embodiment of a system for restricting operation of wireless devices.

FIG. 6 illustrates another embodiment of a system 600 for restricting operation of wireless devices. System 600 comprises a computing apparatus 601, which may be an embodiment of controller 101, described in the discussion of FIG. 1. Computing apparatus 601 comprises a communication module 602, which communicatively couples apparatus 601 to a media drive 603 for computer readable media, illustrating an optical disk, as well as network 110 and sensors 102a-102d. Other types of computer readable media, such as non-volatile memory devices and magnetic media may also be used. Communication module 602 is illustrated as having an antenna for wireless communication with user control 105. Communication module 602 may be a single module or may comprise many different modules, and may comprise hardware, such as connectors, firmware, and even software, such as internet connectivity software.

Apparatus 601 also comprises at least one central processing unit (CPU) 604, although multiple processors may be used, and a memory 605. Memory 605 may comprise volatile and non-volatile memory, and even other computer readable media. In the illustrated embodiment, memory 605 holds part of communication module 602. Memory 605 holds other modules and data sets used in the operations described above, although many of the illustrated modules may also have hardware or firmware components. These include a control module 606, which can interface with other illustrated modules, and coordinate their operations for sensor position calibration, zone definition, restriction request communication, device exception handling, position calculations, and other functions.

Operator database 607 has information relevant to communication with nodes 120 and 130 and any other cellular network operations nodes. This may include internet addresses of node computers and security protocols. Security module 608 has security functionality, possibly including encryption and hash routines. It is used for securing communications with remote operator control nodes, for example nodes 120 and 130 and, in the illustrated embodiment, has access to keys 103 and 104. As a clarification to the differences between security module 608 and keys 103 and 104, security module 608 contains algorithms, and possibly hardware random number generators. Timing module 609 is used as a time reference, and may be used to keep a clock synchronized with a base station clock for use in the TDD and TDMA enabled range-finding systems previously described. However, timing module 609 may have its own internal clock, which is free from external synchronization with base station clocks. Timing module can be used for both the time of arrival calculations, as well as the tracking time-out periods for devices within a restriction zone, so that timely updates can be sent to nodes 120 and 130.

Calibration and setup module 610 can be configured to operate with remote interface module 611, which handles communication with user control 105, sensor position database 612, and zone boundary database 613. Sensor position database 612, and zone boundary database 613 may be based on time of arrival information only, and therefore have only relative positions, such as radial distances, or may have GPS coordinates, if any of sensors 102*a*-102*d* or user control 105 had GPS data and sent it to apparatus 601 during calibration and setup. Data in some embodiments of zone boundary database 613 will comprise the vertices of at least one closed polygon. Remote interface module 611 also works with blocking rules database 614 and detected device database 615 to handle exceptions for selected devices. For example, blocking rules database 61 could permanently store the identity of device 641, so that the next time device 641 entered zone 150, it would go to relaxed restrictions, rather than default restrictions. Math module 616 may comprise standard triangulation calculation routines, which are known in the art. For example, U.S. Pat. No. 5,327,144 by Stilp et al. and U.S. Pat. No. 5,890,068 by Fattouche et al. disclose triangulation schemes for locating cellular devices.

Figure 7:
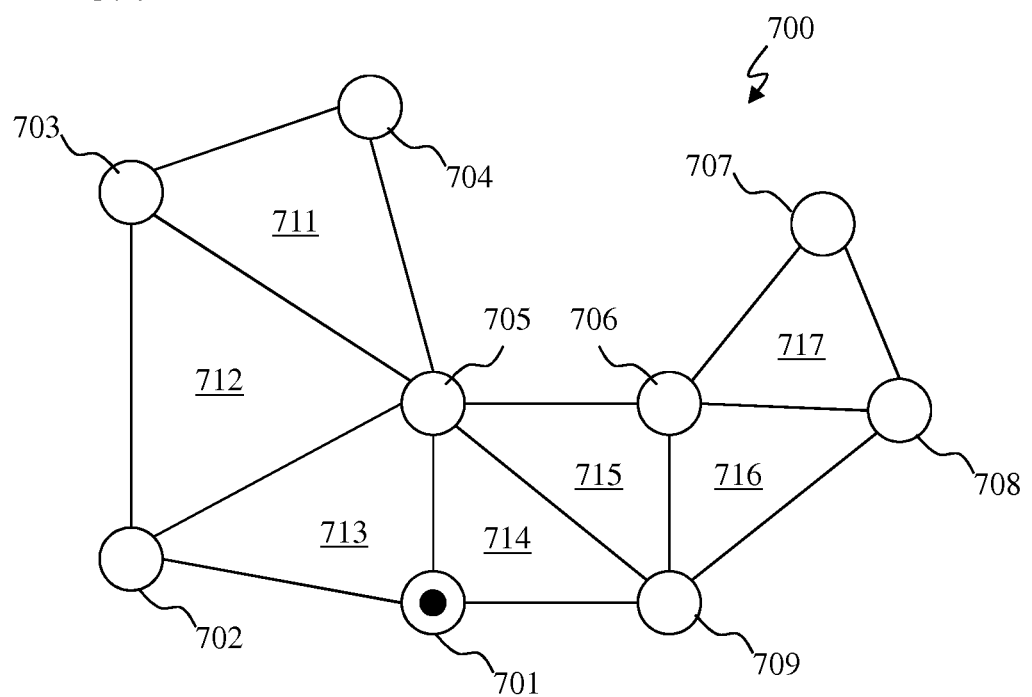
FIG. 7 illustrates another embodiment of a system for restricting operation of wireless devices.

FIG. 7 illustrates another embodiment of a system 700 for restricting operation of wireless devices. System 700 comprises a controller 701, which also comprises a sensor. System also comprises sensors 702-709, numbered clockwise. The restriction zone is the entire area covered by the set of triangular sub-zones 711-717. The combination of zones 714 and 715, formed by controller 701 and sensors 705, 706 and 709, illustrates how a rectangular-shaped region can be set up using triangles. During setup, each sensor is paired with two others, in the memory of controller 701, to form the triangular sub-zones. When a triangular sub-region is formed in this manner, the triangle will have no reflexive angles.

During operation, when a wireless device is identified, controller 701 sequentially solves an inside/outside calculation for each of the sub-zones, until one calculation returns an inside condition, or all sub-zones have been considered. If a device is within any of the sub-zones, then a usage restriction is requested. In some embodiments, a controller, for example controller 701, may send a usage restriction request directly to a wireless device rather than involving the network operator. For this to work though, the device must comply with the request. Using a network operator to implement the request takes compliance by the device out of primary consideration as a defeat to the system's operation. Other variations can exist, if controller 701 is the only sensor available. If controller uses the TDD and TDMA range finding method, described earlier, then the restriction zone can be a sphere around controller 701. Adding direction of arrival discrimination to the sensor on controller 701 enables the shape of the restriction zone to be tailored, such that it extends further in range in some directions.

Figure 8:
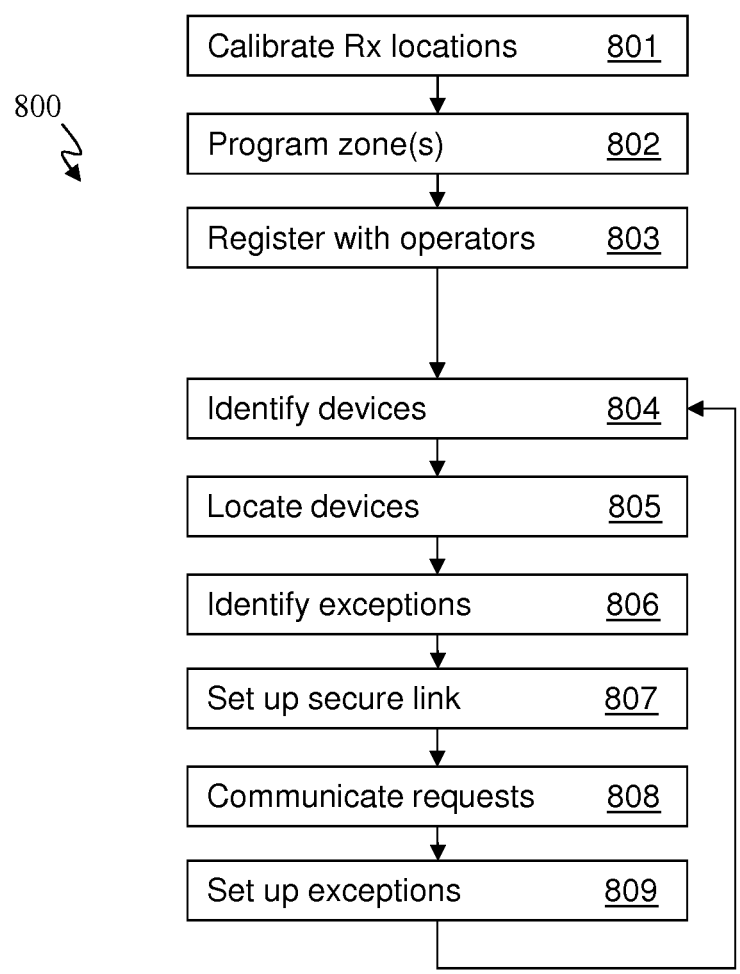
FIG. 8 illustrates a method of restricting operation of wireless devices.

FIG. 8 illustrates a method 800 of restricting operation of wireless devices. In block 801, the sensor positions are calibrated. A method for performing this has been described previously, and a method is also illustrated in FIG. 9. In block 802, the restriction zones are defined. A method for performing this has been described previously, and a method is also illustrated in FIG. 10. In block 803, the controller registers with cellular network operators, for example by exchanging security tokens between controller 101 and each of nodes 120 and 130, illustrated in FIG. 1.

In the illustrated method, normal operations of the system begin in block 804 and cycle while the system remains in operation. It should be understood that variations in the order of the blocks of method 800 may occur. Devices are identified in block 804, and their positions calculated in block 805. For those devices within a restriction zone, the exceptions from restrictions, as well as restriction customizations are identified in block 806. In block 807, a secure communication link is set up between the controller 101 and at least one of node 120 and node 130, if a secure link does not exist. The secure link may use encryption, and be, for example, a Secure Socket Layer (SSL) session. Alternatively, data could be sent over unsecured sessions, but the data should be secured, such as by encryption. The requests are communicated to the network operators in block 808, and may be just identification information, if a default restriction type has been previously defined, or may be relaxation requests or restriction customization requests. In block 809, exceptions for certain devices are stored, perhaps in blocking rules database 614 of FIG. 6. A method for performing this has been described previously, and a method is illustrated in FIG. 11. Therefore, a method of restricting the operation of a radio communication device may comprise determining an identity of a device, using a radio transmission from the device; determining whether the identified device is within a predefined usage restriction zone, using time of arrival information from a plurality of sensors, for a radio transmission from the device; and securely communicating the identity of the identified device to a remote node, across a public computer network. The method may further comprise repeatedly communicating the identity of the identified device to the remote node, while the identified device remains within the usage restriction zone.

Figure 9:
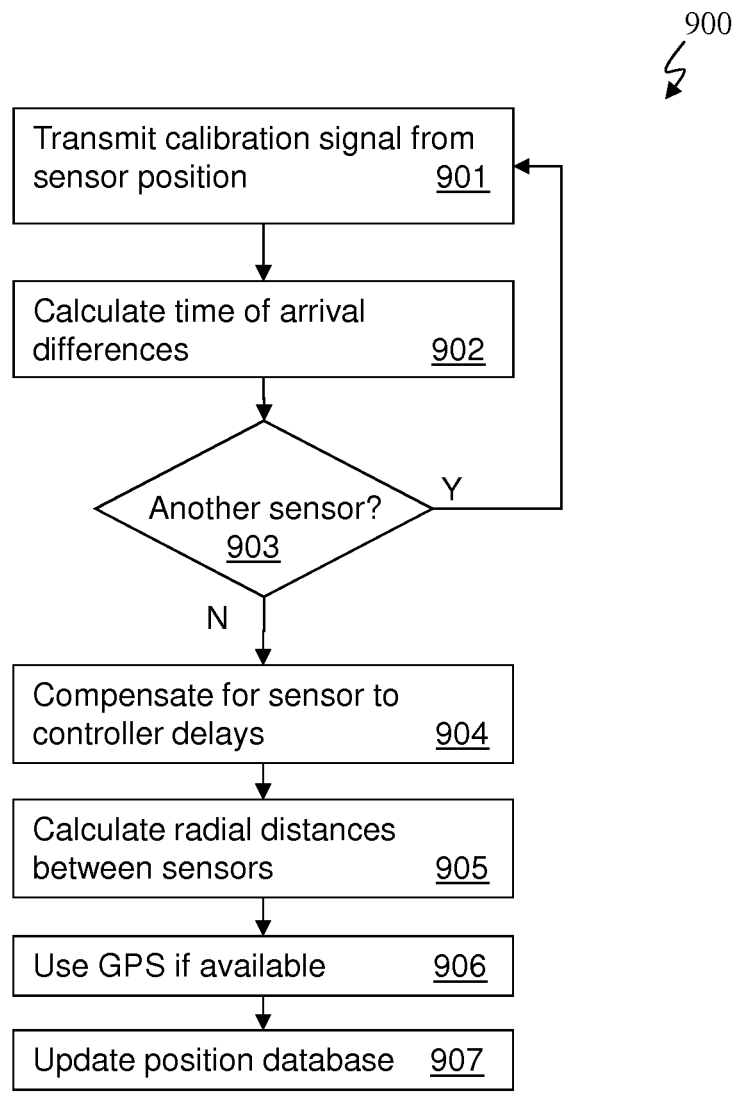
FIG. 9 illustrates a method associated with restriction of wireless device operation.

FIG. 9 illustrates a method 900 of calibrating sensor positions. In block 901, a calibration signal is sent from the location of a sensor. This can be the sensor itself, or a user control adjacent to a sensor. In block 902, the time of arrival differences are measured. In decision block 903, it is determined whether enough sensor positions have been measured in order to complete the calculations. For a system having four or more sensors, or sensors with known communication delay times, there may not be a need to send calibration signals from all of the sensors. In block 904, the data for time of arrival differences are adjusted for communication delays between each of the sensors and the controller. In some systems, multiple controllers or sub-controllers can be used, with time of arrival compensations including the transit times for routing information to other places, rather than directly to a single controller. In block 905, distances between the sensors are determined, using the propagation delays of the calibration signals. GPS information can be used to establish actual position data, rather than just relative position data in block 906, if the information is available. The results of the sensor position calibration process are then stored in RX position database 612, of FIG. 6.

Figure 10:
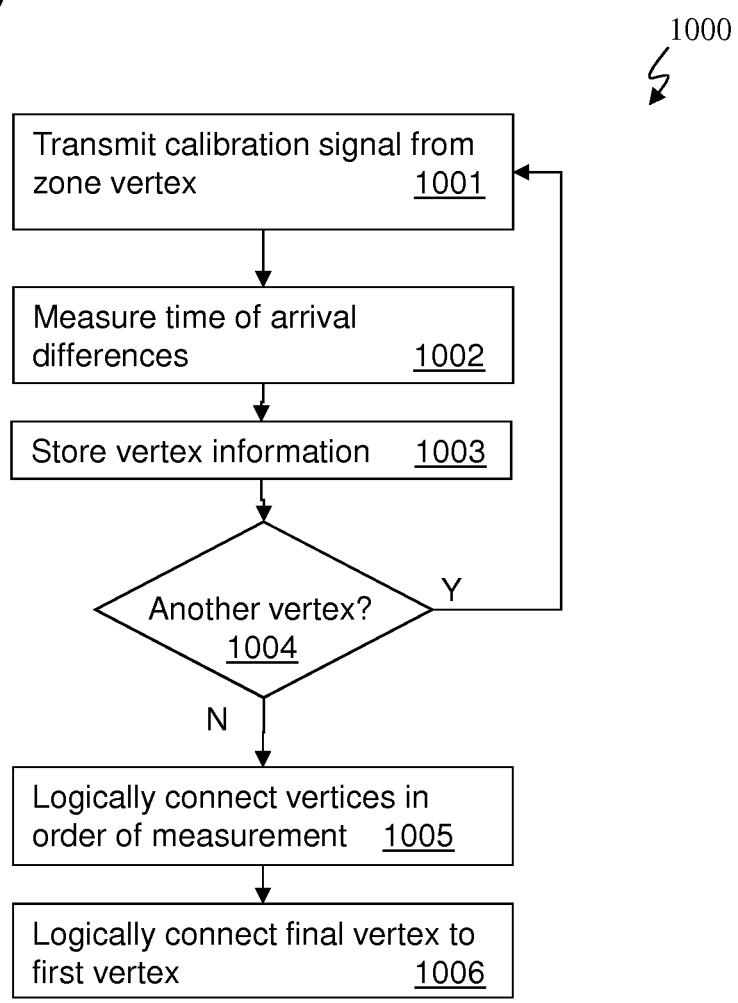
FIG. 10 illustrates another method associated with restriction of wireless device operation.

FIG. 10 illustrates a method 1000 of defining a restriction zone. In block 1001, a calibration signal is sent from the location of a vertex of the desired restriction zone, possibly from wireless user control 105. In block 1002, the time of arrival differences are measured from that vertex to each of the sensors, and are compensated for with communication delay information found earlier, in method 900. In block 1003, vertex positions are determined and stored in zone boundary database 613, of FIG. 6. In decision block 1004, it is determined whether all the vertices have been defined for the zone. If not, then another calibration signal is sent from the next desired vertex, as method 1000 returns to block 1001. When all the vertices have been set, the restriction zone is then defined as a closed polygon with vertices in the order of measurement, except that the final vertex is connected with the first, to close the polygon. This is accomplished in blocks 1005 and 1006.

FIG. 11 illustrates a method 1100 of handling exceptions to the restrictions. In block 1101, a wireless device is identified for exceptional treatment, whether exemption from restriction, more sever restriction, or less severe restriction. This can be accomplished with user control 105 in close proximity, and pointing at the device, as described in relation to FIG. 1. In decision block 1102, it is determined whether the exception will be durable, that is, it will endure even after the device has left a restriction zone, so that the exceptions are automatically applied when the device next enters a restriction zone. If the exceptions are not durable, then in decision block 1103, it is determined whether they are temporary, and will expire after a set period of time. If so, then a timer is set in block 1104, perhaps using timing module 609 of FIG. 6. The exception information regarding the device identity, durability, and duration, is then stored in block 1105, and if necessary, communicated to a network node in block 1106.

Network operators play a crucial role in the operation of some of the disclosed embodiments. They make a restriction decision after receiving a request from a Cilense™ system, and may insist on verifying the authenticity and authorization of the request. In some situations, an operator may over-ride the requested restrictions and substitute a different set. The operator may then communicate back to the requester confirming or denying the request, or informing about a modification. In some situations, a network operator may cooperate with restaurant ad theater owners willingly, and therefore may reserve the right to deny or modify the restriction request. In other situations, the requester may have police or government authority, so the operator may have a duty to comply.

The operator may inform the restricted device of the restriction, possibly informing the device about the ability to send or receive urgent calls for a fee. This may be automatic, or in response to an attempted call or sending of a message, and may be displayed or sent as an audio message. Outside callers may be informed about the restrictions by the network equipment, when attempting to call the restricted device. The device may be provided instructions by the network to enter a battery-saving mode, dim the screen, enter vibrate or silent mode, display a message on the screen of the device, or return from restricted operation modes, or refrain from participating in any self-assembling, peer-to-peer or ad-hoc networks, and then comply if the instructions satisfy security screening criteria. The restriction on network participation is to prevent a cellular device within a restriction zone from communicating through another nearby cellular device that is outside the restriction zone, and riding on that nearby cellular device's network connectivity to send and receive prohibited messages, thereby thwarting the operation restrictions. Wireless devices nearby a restriction zone, but located outside, or else within the restriction zone and exempt from the restrictions, which are also range of the ad-hoc network connectivity of restricted devices, may receive and acquiesce to requests to temporarily disable self-assembling or ad-hoc network capability, or to deny connectivity to identified devices within the restriction zone. The wireless device may further display the authority or some identifying information about the entity requesting the restriction, and may receive this from either the entity itself or from the serving network. The status of the device with in a restriction zone may be returned as part of a chaperone service, which enables someone to remotely ascertain the location of another person's cell phone.

Although the present invention and its advantages have been described above, it should be understood that various changes, substitutions and alterations can be made herein without departing from the spirit and scope of the invention as defined by the appended claims. Moreover, the scope of the present application is not intended to be limited to the particular embodiments described in the specification.

What is claimed is:

1. A system for restricting operation of a cellular device in restricted areas without requiring cooperation from the cellular device, the system comprising:
    a plurality of at least three sensors, each sensor remotely located from all serving cellular base station sites and remotely located from the cellular device, each sensor configured to receive a radio transmission from the cellular device; and
    a controller, communicatively coupled to each sensor of the plurality of sensors, the controller remotely located from all serving cellular base station sites and remotely located from the cellular device, the controller comprising a memory;
    the memory containing a definition of a first usage restriction zone;
    the controller configured to:
        receive, from the plurality ofسensors, information about a radio transmission from the cellular device;

determine, using the received information, an identity of the cellular device, without requiring reception and processing of any wireless signals by the device;

determine, using the received information, whether the cellular device is within the first usage restriction zone, without requiring reception and processing of any wireless signals by the device; and responsive to determining that the cellular device is within the first usage restriction zone, securely communicate the identity of the cellular device to a remote node across a public computer network and request that all serving cellular networks restrict service to the cellular device;

such that restriction of the operation of the cellular device occurs without requiring cooperation from the cellular device.

2. The system of claim 1 wherein the information about a radio transmission from the cellular device comprises angle of arrival information at a sensor.

3. The system of claim 1 wherein the information about a radio transmission from the cellular device comprises time of arrival information at a sensor.

4. The system of claim 1 further comprising:
a definition of a second usage restriction zone, the second usage restriction zone separate from the first usage restriction zone, and wherein the controller is further configured to restrict operation of the cellular device responsive to the cellular device being located within the second usage restriction zone.

5. The system of claim 1 further comprising:
a definition of usage restriction rules within the memory, wherein the controller is further configured to securely communicate the type of usage restriction for cellular device to the remote node, the type of usage restriction being in accordance with the usage restriction rules.

6. The system of claim 5 wherein the usage restriction rules permit texting and block phone calls.

7. The system of claim 5 wherein the usage restriction rules permit phone calls and block texting.

8. The system of claim 1 further comprising:
a device exception list within the memory, wherein the controller is further configured to:
determine whether the cellular device identity is within the exception list; and
responsive to the cellular device identity being found within the exception list, not send a usage restriction request for the cellular device, even if the cellular device is within a usage restriction zone.

9. The system of claim 1 further comprising:
a remote user control having a user input control, separate from the sensors and the controller and the cellular device, wherein the user remote control is configured to transmit a calibration signal upon actuation of the user input control; and
wherein the controller, upon receiving the calibration signal through the plurality of sensors, determines a position of the remote user control and uses the determined position to define a vertex of a usage restriction zone.

* * * * *